United States Patent [19]

Diego

[11] Patent Number: 4,611,945

[45] Date of Patent: Sep. 16, 1986

[54] ARTICULATING JOINT FOR FOLDING TUBULAR SECTIONS

[76] Inventor: Dennis F. Diego, 2129 Penasquitas Dr., Aptos, Calif. 95003

[21] Appl. No.: 742,706

[22] Filed: Jun. 7, 1985

[51] Int. Cl.$^4$ .............................................. F16C 11/00
[52] U.S. Cl. ........................................ 403/61; 403/96; 403/102
[58] Field of Search .................. 403/102, 100, 61, 62, 403/93, 96, 92

[56] References Cited

U.S. PATENT DOCUMENTS

| 1,039,986 | 10/1912 | Merritt | 403/61 |
| 2,692,153 | 10/1954 | Schlueter | 403/92 |
| 2,895,757 | 7/1959 | Kaspar | 403/100 |
| 3,235,038 | 2/1966 | Nesslinger | 403/54 X |
| 3,655,297 | 4/1972 | Bolen, Jr. et al. | 403/102 X |
| 4,131,378 | 12/1978 | Daws | 403/93 |

FOREIGN PATENT DOCUMENTS

| 122669 | 5/1931 | Austria | 403/100 |
| 176776 | 7/1935 | Switzerland | 403/100 |

Primary Examiner—Andrew V. Kundrat
Attorney, Agent, or Firm—Browdy and Neimark

[57] ABSTRACT

An articulation, or knuckle joint, which may be housed within two tubular sections to define a concealed fixing element enabling the sections to act as a single member, and which facilitates the folding or collapsing of the two sections by simply pulling them apart and rotating them about the articulation or knuckle joint.

15 Claims, 10 Drawing Figures

ARTICULATING JOINT FOR FOLDING TUBULAR SECTIONS

BACKGROUND OF THE INVENTION

The present invention relates to an articulating joint for coupling members, such as tubular sections, of various assemblies where the members are capable of transmitting axial, torsional and bending stresses in their extended position, yet are foldable for collapsing into a more compact arrangement.

More particularly, the joint of the present invention is virtually completely contained inside a tubular section to which it is coupled when in the unfolded or concealed position, and facilitates a simple, flush appearance of two connected tubular sections.

One contemplated use of the joint of the present invention is in a folding ladder consisting of two or more sections which are pivotally interconnected. The sections are arranged to permit the ladder to fold or collapse to a reduced size on the order of one of its ladder section components for portability and/or storage.

The articulating joint of the present invention provides means for movement, as well as coupling, of tubular sections without the use of another element such as a sleeve or external linking part. Joints which require sleeves are disclosed in U.S. Pat. No. 3,235,038 to Nesslinger and U.S. Pat. No. 2,895,757 to Kaspar. Furthermore, the arrangement of the present invention allows tubular sections to be folded without having to axially rotate them or unscrew an internally contained bolt or sliding shaft (see, for example, the joint disclosed in U.S. Pat. No. 3,655,297 to Bolen, Jr., which does not permit the sections to be secured in a folded position and only facilitates, with the aid of an additional part (sleeve 24), the fixing of the two sections when the sections are disposed axially opposite one another).

OBJECTS OF THE INVENTION

It is therefore the primary object of the present invention to provide a simple, concealable articulating joint which overcomes the above-described deficiencies of the known related art.

Another object is to provide an articulating joint for connection between two tubular sections capable of sustaining substantial axial, transverse, torsional and bending loads.

Yet another object of the invention is to provide an articulating joint which can be combined with axially aligned tubular sections, which is easily disengaged from a concealed position (when the two sections abut) to permit angular movements of one or both of the joined sections relative to the other and the joint itself.

Still another object is to provide a fixing mechanism associated with the articulating joint for securing the tubular sections in either their aligned position or their angularly disposed position.

Still another object of the present invention is to provide an articulating joint having the abovementioned character and functions with economy of construction and simplicity in operation, whereupon it has widespread applications.

These objects are embodied in a novel articulating joint which is to be combined with the ends of tubular elements, so that the elements can function as a single united member, or as two folded, yet distinct and attached, elements.

BRIEF DESCRIPTION OF THE DRAWINGS

Further objects and advantages will become apparent to persons skilled in the art upon reading the detailed description which follows hereinafter when taken into consideration with the accompanying drawings forming a part of this specification and showing, for purposes of illustration, preferred forms of this invention, without limiting the claimed invention to such illustrative instances. These drawings include:

DETAILED DESCRIPTION OF THE INVENTION

Figures 1, 2, 3:
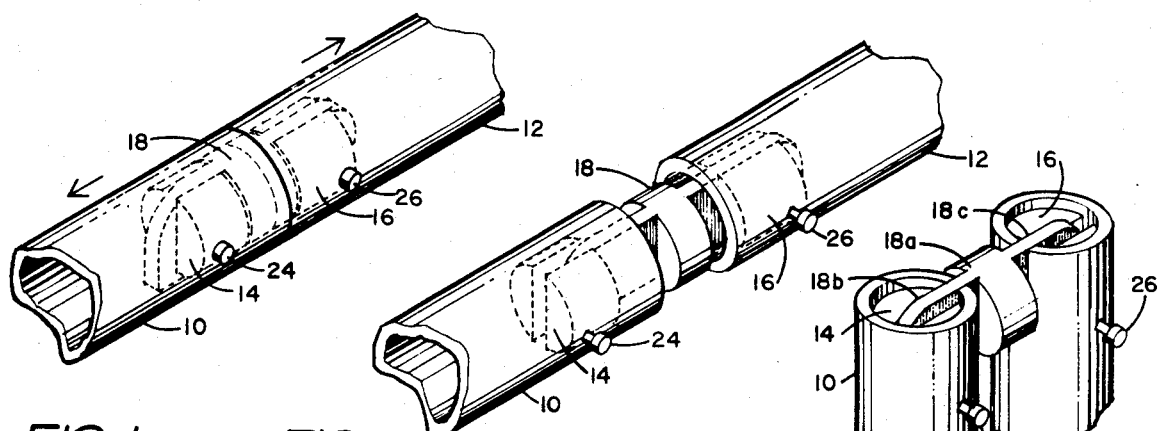
FIG. 1 which is a perspective view of a preferred embodiment of the invention showing tubular sections secured in an end-to-end position with the articulating joint concealed.
FIG. 2 which is a perspective view of the embodiment of FIG. 1 in an unengaged position with the tubular sections still in axial alignment.
FIG. 3 which is perspective view of the embodiment of FIG. 1 in its unengaged and folded position, the tubular sections each having been rotated 90° about the articulating joint into positions where both tubular sections are parallel.

Referring now to FIG. 1, FIG. 4, FIG. 5 and FIG. 9, the tubular element or section 10 may be considered the top end of a lower section tubular support member and the tubular element or section 12 may be considered the bottom end of an upper section tubular support member. Disposed within the top end of element 10 is a plug 14 consisting of two segments of a cylinder joined by a transverse pivot pin 14a, which is fixed (by any suitable means, such as a weld, screw, or the like) to the inside of the tubular section 10 so as to become an integral part with that section. In a similar manner, a plug 16 of the same construction as plug 14 is disposed within the bottom end of tubular section 12 as a reverse mirror-image of plug 14 and the two cylinder segments of plug 16 are joined together by a transverse pivot pin 16a (see FIG. 4). The radius of the curved surfaces of the cylindrical segments of each of plug 14 and 16 are desirably substantially equal to the interior radius of their respective tubular sections 10 and 12 so as to have the surfaces in direct contact with the interior walls of the tubular sections; however, it is sufficient if the exterior configuration of the segments of each plug are congruous with the interior configuration of the respective tubular sections. Disposed between, and coupling, the plugs 14 and 16 is a linking element 18 which preferably includes a central cylindrical portion 18a having a longitudinal axis and two identical linking flanges 18b, 18c each extending in a direction parallel to the axis and opposite from one another away from a respective one of the planar faces of cylindrical portion 18a. Each linking flange includes an elongated hole or slot (slot 20 in flange 18b; slot 22 in flange 18c), and transverse pivot pins 14a and 16a are positioned for passage through slots 20 and 22 on the sides thereof closest to the central cylindrical portion 18a. Flange 18b includes a partially circular (¼ circle) edge 19 at one corner disposed opposite portion 18a and a squared notch 21 at the opposite corner. Similarly, flange 18c includes a partially circular (¼ circle) edge 19' at one corner disposed opposite portion 18a and a squared notch 21' at the opposite corner. The linking flanges 18b, 18c of linking element 18 are each slidably supported in the space defined between the pair of cylindrical segments of plugs 14 and 16, respectively. The edge 18d of the flange between the notches is configured to fit into, and extend between, longitudinally extensive slots provided (e.g., by cutting) in radially aligned locations of tubular sections 10, 12. Each slot preferably has a width substantially equal to the width of the flange, and each slot is cut into the ends of the sections 10 and 12 adjacent the linking element 18. The flange edge 18d will lie flush with the outside surface of the tubular sections when the sections are disposed in the position shown in FIGS. 1 and 2, and when the sections are disposed in the folded position shown in FIG. 7, the flange surface 18e will lie flush (i.e., in the same plane) as the end faces of the respective tubular sections. In the linking flanges 18b, 18c, the radius of each of the ¼ circle edges 19, 19' is equal to that of the interior of the tubular sections 10 and 12, and the length of the flange edge 18d between the squared notches is equal to the sum of two interior diameters d plus two thicknesses t. The cylindrical portion 18a of the linking element 18 preferably has a diameter d substantially equal to the interior diameter d of the tubular sections 10 and 12.

The plugs 14 and 16 thus provide a housing for the linking flanges 18b, 18c, and afford the tubular sections 10 and 12 with a reinforcing connection which restores any structural integrity which might be lost due to the cutting of the slots into the tubular sections.

For purposes of locking the tubular sections 10, 12 in an axially aligned, abutting position as shown in FIG. 1, the locking pins 24 and 26 normally pass through the slots of each linking flange 18b, 18c at the ends thereof furthest from the central cylindrical portion 18a of the linking element 18. From FIG. 5 it will be seen that the locking pins 24 and 26 each have a head 24b, 26b which protrudes outside of the respective tubular section 10, 12, and tapered convex ends 24c, 26c on the end of the respective pin opposite the heads 24b, 26b. The tapered ends are joined to the respective heads by a shaft. The shafts are housed within biasing springs 24a and 26a, which in turn are housed inside a passageway or hole in one of the cylindrical segments of each plug 14, 16. Each spring biases the tapered end 24c, 26c of each of the locking pins 24, 26 securely against tapered indentations 30 and 28, respectively, located in the flat surface of the other of the cylindrical segments. Each hole or indentation is configured with a female profile to accommodate the male profile of the tapered ends of the locking pins.

Figure 4:
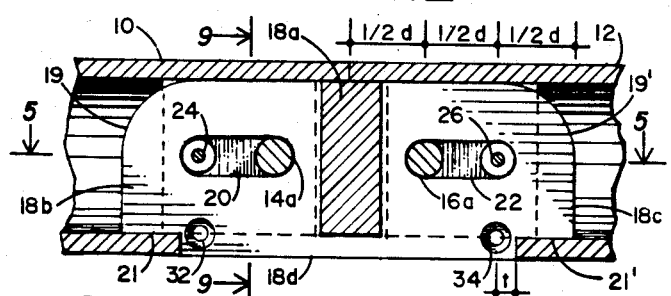
FIG. 4 which is a view, partially in section, taken along line 4—4 of FIG. 5, with the tubular sections being in the position shown in FIG. 1.

As shown in FIG. 4, when the linking element and plugs are completely contained within the tubular sections, the distance between the end of either one of the tubular sections (or transverse centerline of the linking element 18) and the centerlines of the transverse pivot housed within that tubular section is less than or equal to one half the interior diameter d of that tubular section. Similarly the distance between the centerlines of the transverse pivots 14a and 16a and the centerlines of the respective locking pins 24 and 26, as well as the distance between the outermost edge of a linking flange 18b or 18c and the respective locking pin 24 or 26, is equal to one half the interior diameter d of the tubular sections 10 and 12.

By pulling the respective protruding head 24b, 26b of the locking pin 24, 26 outwardly (away from the side of the respective tubular section), the biasing springs 24a and 26a are compressed and each respective tapered end 24c, 26c is drawn out of its indentation and into the associated passageway of its cylindrical segment in plug 14 or 16 until it has cleared the innermost edge of the slotted hole. Thereafter, the two tubular sections 10 and 12 will be unlocked from each other, and can be pulled apart. This will result in a displacement of each transverse pivot pin 14a or 16a in its respective slot 20, 22 outwardly in a direction away from the central portion 18a, whereupon the transverse pivot pin will assume the position shown in FIG. 6.

Figure 6:
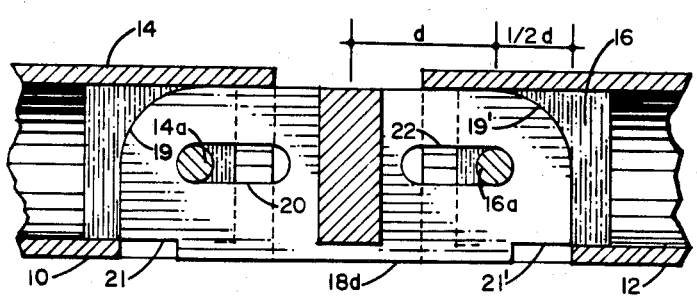
FIG. 6 which is a partial sectional view of the two tubular sections in the position shown in FIG. 2.

Looking more closely at FIG. 2 and FIG. 6, it can be seen that the linking element 18 is then visibly exposed, and that the transverse pivot pins 14a and 16a each now occupy the end of the slotted holes 20, 22 of respective linking flanges 18b, 18c previously occupied by the locking pins 24 and 26, respectively. The position of each transverse pivot pin 14a and 16a relative to the curved edge 19, 19' of the respective linking element flange portion 18b, 18c allows rotation of the tubular sction 10 in a counter-clockwise, and tubular section 12 in a clockwise, direction relative to the longitudinal axis of linking element 18 until each sectioin has moved 90 degrees into position. The distance between the centerline of the transverse pivot pins 14a and 16a and the edges of the linking element flange portion furthest from the central portion is equal to one half the interior diameter of the tubular sections 10 and 12.

Figure 7:
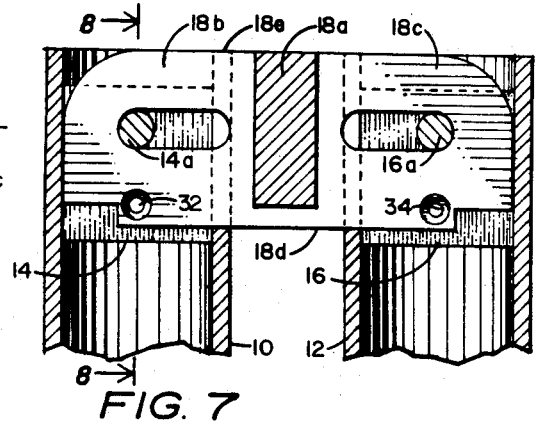
FIG. 7 which is a partial sectional view of the two tubular sections in the position shown in FIG. 3.
Figure 5:
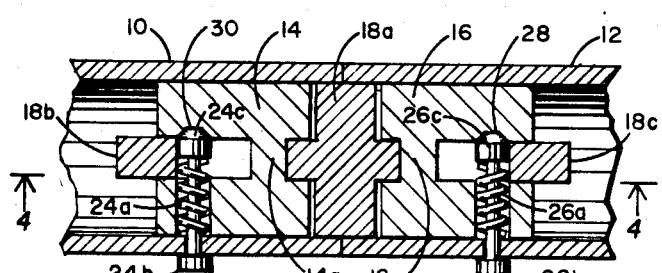
FIG. 5 which is a partial sectional view taken along line 5—5 in FIG. 4.

Referring to FIG. 3 and FIG. 7 where the tubular sections 10 and 12 are shown disposed side-by-side and parallel to one another (in which the central portion of the linking element 18 and the ends of the plugs 14 and 16 are exposed to view), the tubular sections 10 and 12 are depicted as being held in position by the edge 18d of the element 18 abutting against the terminal edge of the slots in each tubular section. This abutment prevents the sections from further rotation about the respective transverse pivots 14a and 16a.

Figure 8:
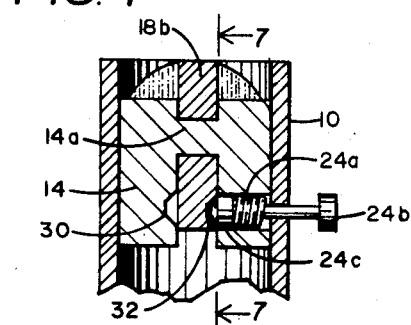
FIG. 8 which is a view, partially in section, taken along line 8—8 in FIG. 7 of the two tubular sections in the position shown in FIG. 3.

FIG. 8 illustrates the tapered head 24c of the locking pin 24 held against the indentation 32 on the locking flange 18b when the rotation of the tubular section 10 about pivot 14a brings the tapered head and the indentation into alignment. It is to be understood that the tapered head 26c has the same relationship with its corresponding indentation 34 as the parts 24c and 32. Both indentations 32 and 34 have a concave profile configured for mating receipt of the convex profile of the tapered heads of locking pins 24 and 26. By moving the locking pin 24 away from the interior of section 10 until the tapered head 24c has cleared the face of the linking flange 18b and is contained in the passageway of the segmented cylinder of plug 14, the tubular section 10 is once again free to rotate in the opposite direction.

Figure 9:
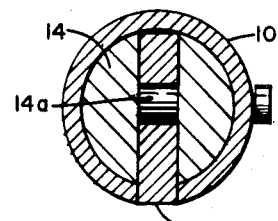
FIG. 9 which is a cross-sectional view along line 9—9 in FIG. 4.

FIG. 9 is a view of the tubular section 10 in a position where sections 10 and 12 are aligned as illustrated in FIG. 1, and shows the linking element 18, the plug 14 and the slot in the tubular section 10 all in an interlocked relationship, the entire cross-section of the assembly being solid with the exception of the slotted hole 14a of the linking flange 18d. This substantially solid arrangement of the interlocking parts gives the embodied articulation the requisite strength and structural integrity to allow the two tubular sections to behave as though they were one continuous section.

Figure 10:
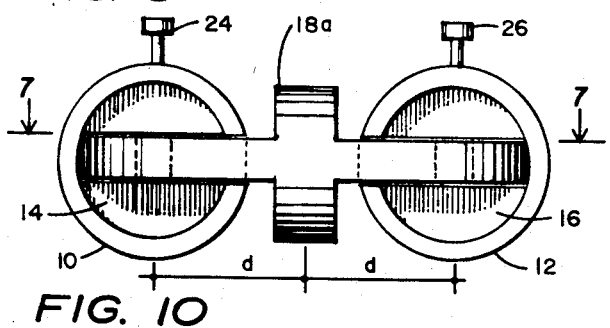
FIG. 10 which is a top view of the ends of the tubular sections and the articulating joint in the position shown in FIG. 3.

FIG. 10 depicts the distance from the centerline of each of the tubular sections 10 and 12 to the centerline of the linking element 18 as being equal to the interior diameter d of the tubular sections.

The foregoing description of the specific embodiments fully reveals the general nature of the invention so that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phrasiology or terminology employed herein is for the purpose of description and not of limitation.

What is claimed is:

1. In combination with two tubular members, articulating means for coupling said tubular members, comprising:

a central portion having a longitudinal axis,
 flanges extending from opposing sides of said central portion in a direction parallel to said axis,
 plug means pivotably attached to each of said flanges,
 means for releasably fixing each of said plug means to said flange means so that said plug means can assume a first, axially aligned position and a second angularly disposed position wherein said plug means are disposed at an angle of at least 90°,
 each of said plug means, said central portion and said flanges having an external configuration for telescopic receipt within the internal configuration of said tubular members, and each of said plug means being received in one of said tubular members and fixed therein by fixing means,
 whereby said articulating means are housed entirely within said tubular members in said first position so that adjacent ends of said tubular members are positioned in abutting axial alignment while said articulating means housed in the joined tubes aids in resisting axial, transverse, bending and torsion loads at their juncture.

2. The combination of claim 1 wherein each said flange includes an aperture, and each said plug means comprises a pair of segments interconnected by pivot pin means extending transversely of said segments.

3. The combination of claim 2 wherein said aperture comprises a slot, at least the major portion of said slot extending in the direction of said axis.

4. The combination of claim 1 wherein said fixing means comprises an indentation carried by each said flange at a location remote from said central portion and pin means supportable by each respective tubular member, said pin means including means for urging one end thereof into contact with a respective one of said indentations when said tubular members are in said first position.

5. The combination of claim 4 wherein said pin means one end is convex and said indentation is concave.

6. The combination of claim 4 wherein each said urging means includes a compressible member normally biasing said pin means in a direction perpendicular to said axis, said compressible member being housed substantially entirely within a portion of each said plug means.

7. The combination of claim 6 wherein each said plug means comprises a pair of interconnected segments, said portion consists of one of said segments, and the other of said segments includes a depression, said pin means one end being urged by said compressible member into engagement with said depression when said tubular members are disposed in said second position.

8. Apparatus for pivotably coupling a tubular member to a support member, comprising:

a first portion having a longitudinal axis, one end of said first portion being secured to said support member, said first portion having an external configuration adapted for telescopic receipt within, and being congruous with, the internal configuration of said tubular member,
 a second elongated portion extending from said first portion in a direction away from said one end, said second portion including a slot extending in said direction,
 a third cylindrical portion including means, extending through said slot, for pivotably attaching said second and third portions, and
 means, carried by said tubular member and normally extending through said slot, for selectively securing said tubular member to said second portion between a first position in which the longitudinal axis of said tubular member coincides with said first portion axis wherein said first, second and third portions are telescopically received within said tubular member, and a second position in which said tubular member axis is not coincident with said first portion axis.

9. The apparatus of claim 8, wherein said slot comprises a first end disposed near said first portion and a second end, and said attaching means is positioned at said slot first end when said tubular member is disposed in said first position, said attaching means being slidable within said slot to said second end when said securing means is removed from said slot so that said tubular member can be pulled away from said first portion and pivoted about said attaching means to attain its second position.

10. The apparatus of claim 9, wherein said tubular member includes a longitudinally extensive cut having an end removed from the end of said tubular member and a width equal to the thickness of said second portion, pivoting of said tubular member to its second position being delimited by the engagement of said cut end with an edge of said second portion.

11. The apparatus of claim 8, wherein said third portion comprises two spaced apart segments interconnected by said attaching means, the spacing between said two segments being substantially equal to the thickness of said second portion.

12. The apparatus of claim 8, wherein said securing means comprises
 a first depression carried by said second portion,
 a second depression carried by said third portion,
 pin means, and means for urging said pin means into engagement with a selected one of said first or second depressions, whereby said tubular member may be secured in its first position when said pin means engages said second depression, and said tubular member may be secured in its second position when said pin means engages said first depression.

13. The apparatus of claim 12, wherein said pin means includes a head for engaging one of said depressions and said urging means comprises resilient means for pressing said head radially inwardly from the tubular member inside surface.

14. The apparatus of claim 13, wherein said resilient pressing means comprises a coil spring positioned between said head and said tubular member inside surface.

15. An articulating means for coupling two tubular members together, comprising:

a central portion having a longitudinal axis, flanges extending from opposing sides of said central portion in a direction parallel to said axis, plug means slidably and pivotably attached to each of said flanges so that each said plug means can assume a first axially aligned position and a second angularly disposed position, each of said plug means, said central portion and said flanges having an external configuration adapted for telescopic receipt within the internal configuration of the tubular members, whereby coupling of two such tubular members may be achieved by inserting said plug means of each flange into a tubular member, and fixing each plug means to its respective tubular member, whereupon said articulating means may be housed entirely within the tubular members so that adjacent ends of the tubular members are positioned in abutting axial alignment while said articulating means housed in the joined tubes aids in resisting axial, transverse, bending and torsion loads at their juncture.

* * * * *